(12) United States Patent
Lavoie et al.

(10) Patent No.: US 6,512,065 B2
(45) Date of Patent: Jan. 28, 2003

(54) COPOLYMERS OF NORBORNENE AND FUNCTIONAL NORBORNENE MONOMERS

(75) Inventors: Gino Georges Lavoie, Kingsport, TN (US); Peter Borden Mackenzie, Kingsport, TN (US)

(73) Assignee: Eastman Chemical Company, Kingsport, TN (US)

(*) Notice: Subject to any disclaimer, the term of this patent is extended or adjusted under 35 U.S.C. 154(b) by 0 days.

(21) Appl. No.: 10/118,922

(22) Filed: Apr. 10, 2002

(65) Prior Publication Data

US 2002/0111449 A1 Aug. 15, 2002

Related U.S. Application Data

(62) Division of application No. 09/591,571, filed on Jun. 9, 2000.
(51) Int. Cl.⁷ .................. C08F 26/06; C08F 24/00
(52) U.S. Cl. ............... 526/260; 525/326.8; 525/327.3; 525/327.2
(58) Field of Search ................. 526/260, 266; 525/326.8, 327.3, 327.2

(56) References Cited

U.S. PATENT DOCUMENTS

| | | |
|---|---|---|
| 2,721,189 A | 10/1955 | Anderson et al. |
| 4,681,956 A | 7/1987 | Schrock |
| 4,883,851 A | 11/1989 | Grubbs et al. |
| 5,115,037 A | 5/1992 | Asrar |
| 5,603,985 A | 2/1997 | Kent et al. |
| 6,232,417 B1 | 5/2001 | Rhodes et al. |
| 6,235,856 B1 | 5/2001 | Hafner et al. |

FOREIGN PATENT DOCUMENTS

| | | |
|---|---|---|
| EP | 0 904 767 A2 | 3/1999 |
| WO | 93/06171 A1 | 4/1993 |
| WO | 96/04289 A1 | 2/1996 |

*Primary Examiner*—Christopher Henderson
(74) *Attorney, Agent, or Firm*—Jonathan D. Woods, Esq.; Bernard J. Graves, Jr., Esq.

(57) ABSTRACT

The present invention is directed to copolymers of norbornene and functional group containing norbornene comonomers and processes for the preparation thereof. These polymers may be random, alternating or block copolymers or terpolymers, etc.

10 Claims, No Drawings

COPOLYMERS OF NORBORNENE AND FUNCTIONAL NORBORNENE MONOMERS

This application is a divisional of application Ser. No. 09/591,571, filed on Jun. 9, 2000.

FIELD OF THE INVENTION

The present invention is directed to polymer compositions. More particularly, the present invention is directed to polymer compositions obtained by ring-opening metathesis polymerization of functional norbornene monomers.

BACKGROUND OF THE INVENTION

Cycloolefin polymers (e.g. norbornene-based polymers) and copolymers have received a great deal of attention in recent years. They have found application in dielectric, optical, and photolithographic applications. In addition, the utility of these materials as engineering thermoplastics has been explored. As such, new cyclic olefin copolymers and catalysts for the efficient preparation of cyclic olefin polymers are constantly being sought.

The addition polymer of norbornene, i.e., polynorbornene or poly(bicyclo[2.2.1]hept-2-ene, was described in U.S. Pat. No. 2,721,189. In this patent, two types of norbornene polymers were prepared. The first polymer was prepared by the addition polymerization of norbornene giving a fully saturated cyclic olefin polymer.

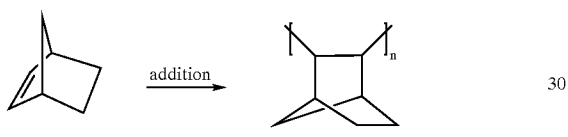

The second polymer was formed by "Ring-Opening Metathesis Polymerization" (ROMP) giving an unsaturated polymer backbone.

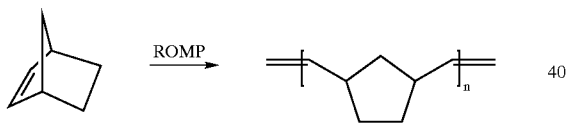

Throughout the years, work in many academic and industrial institutions have led to the development of ring-opening metathesis polymerization catalysts that are tolerant of functional groups. Most notably, are the molybdenum and ruthenium complexes that Schrock and Grubbs have developed (U.S. Pat. No. 4,681,956; U.S. Pat. No. 4,883,851; WO 96/04289). A variety of polymers with pendant functional groups have thus been prepared by ROMP. Further processing of the unsaturated polymers has been attempted in order to achieve materials with better properties. Physical blends (WO 93/06171) and chemical modification of the polymer structure by hydrogenation (U.S. Pat. No. 5,115,037), photolysis (EP 904767 A2) and others U.S. Pat. No. 5,603,985) are all examples illustrating technologies involved in the making of ROMP polymers.

Despite all advances in the new materials prepared by ROMP, there however remains a need to polymerize monomers with functional groups, such as epoxides and dioxalanes, which allow further chemical reactions to give polymers having desired physical properties.

SUMMARY OF THE INVENTION

The present invention relates to a polymer composition having the formula:

$$-[A]_s-[B]_r-$$

wherein A is a monomer repeat unit derived from one or more monomers selected from the group consisting of:

A1

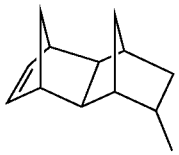

A2

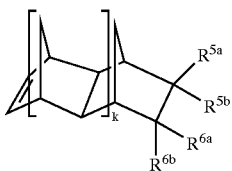

A3

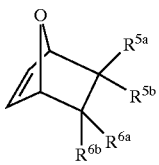

A4

A5

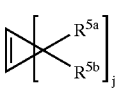

A6 and B is a monomer unit derived from one or more functional norbornene monomers selected from the group consisting of:

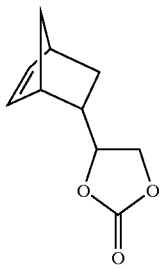

B1

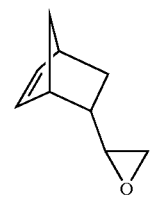

B2

-continued

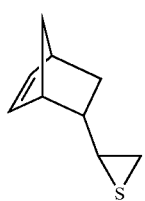
B3

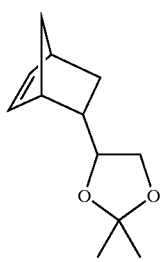
B4

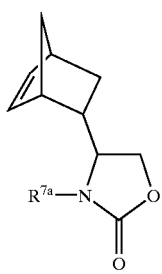
B5

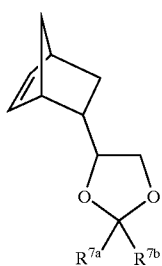
B6

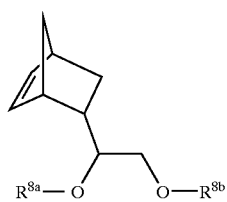
B7 wherein
$R^{7a}$ and $R^{7b}$ are independently selected from H, hydrocarbyl, substituted hydrocarbyl, fluoroalkyl;
$R^{8a}$ and $R^{8b}$ are independently selected from H, hydrocarbyl, substituted hydrocarbyl, fluoroalkyl, $C(O)$—$R^9$;
$R^9$ is hydrocarbyl or substituted hydrocarbyl;
$R^{5a}$ and $R^{5b}$ are each independently H, hydrocarbyl, halogen, halohydrocarbyl, heteroatom connected hydrocarbyl or heteroatom connected substituted hydrocarbyl;
$R^{6a}$ and $R^{6b}$ are each independently H, hydrocarbyl, halogen, halohydrocarbyl, heteroatom connected hydrocarbyl or heteroatom connected substituted hydrocarbyl;
$R^{5a-b}$ and $R^{6a-b}$ may be taken together to form a ring, and S and T represent the mole fraction of the respective monomer unit and sum to one with the proviso that T>0; and k=0–3 and j=1–6.

The present invention is further a process for preparing functionalized polymers comprising the ring opening metathesis of functional norbornene to form homopolymers of norbornene or copolymers of norbornene wherein at least one of the monomers is a functional norbornene. The copolymers may be random, alternating or block copolymers.

DETAILED DESCRIPTION OF THE INVENTION

The present invention relates to polymers having the formula:

$$-[A]_S-\text{ and }-[B]_T-$$

wherein A is a monomer repeat unit derived from one or more monomers selected from the group consisting of:

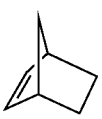
A1

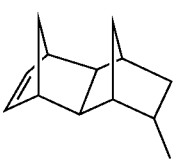
A2

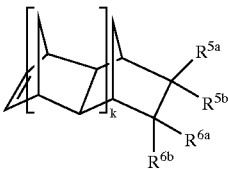
A3

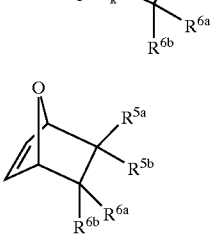
A4

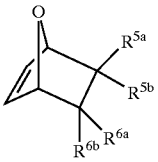
A5

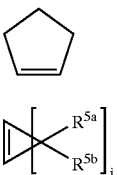
A6 and B is a monomer unit derived from one or more functional norbornene monomers selected from the group consisting of.

B1 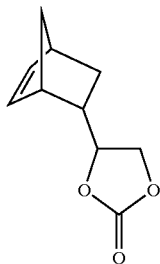

B2 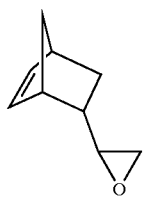

B3 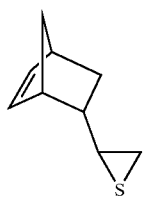

B4 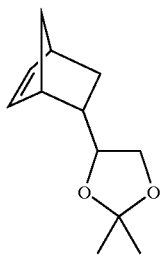

B5 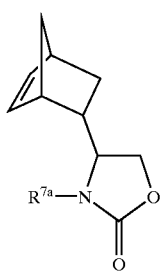

B6 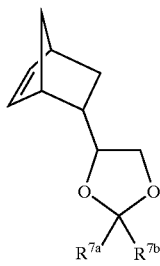

-continued

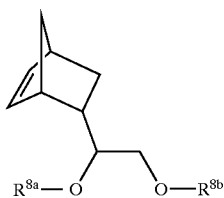
B7 wherein $R^{7a-b}$ is H, hydrocarbyl, substituted hydrocarbyl, fluoroalkyl;

$R^{8a-b}$ is H, hydrocarbyl, substituted hydrocarbyl, fluoroalkyl, C(O)—$R^9$ where $R^9$ is hydrocarbyl or substituted hydrocarbyl;

$R^{5a-b}$ and $R^{6a-b}$ are each independently H, hydrocarbyl, halogen, halohydrocarbyl, heteroatom connected hydrocarbyl or heteroatom connected substituted hydrocarbyl;

$R^{5a-b}$ and $R^{6a-b}$ may be taken together to form a ring, and S and T represent the mole fraction of the respective monomer unit and sum to one with the proviso that T>0; and k=0–3 and j=1–6.

In one embodiment of the present invention, the polymers herein described are prepared by a process including a ring-opening metathesis polymerization of cyclic olefins using metal complexes containg a metal-carbon double-bond which can undergo metathesis with a carbon-carbon double bond present in the monomers. Complexes such as the Schrock-type molybdenum alkylidene or the Grubbs-type ruthenium carbene complexes are preferred catalysts used in this invention.

As means of an example, ring-opening metathesis polymerization of monomers A1 and B4 is illustrated to give a polymer I, where neither the stereochemistry or the nature of end groups are implied by the drawing:

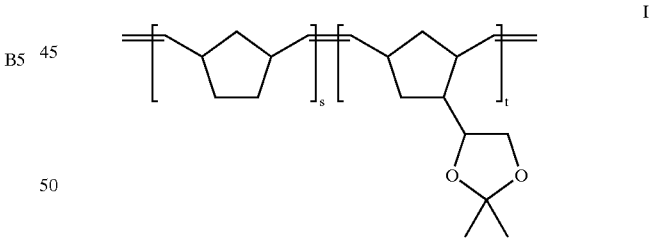
I

As used herein, the phrase "a monomer repeat unit derived from one or more norbornene, substituted norbornene or functional norbornene monomers" refers to the polymer product of the transition metal catalyzed ring-opening metathesis polymerization of said monomers as depicted by polymer I. It is understood that polymer I only depicts one combination of A1 and B4 monomers and that many other combinations of A1 and B4 are possible.

The polymers products described in this disclosure can be filter hydrogenated to give a saturated backbone. For instance, polymerization of monomers A1 and B4 by ring-opening metathesis polymerization produces polymer I as illustrated above. Polymer I can then be hydrogenated to give a polymer with a polyethylene cyclopentane-type structure, polymer II, where neither the stereochemistry or the nature of the end groups are implied by the drawing:

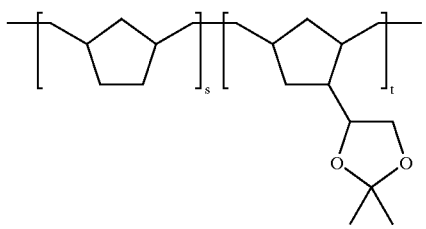

The polymers described in this disclosure can be further hydrolized to give pendant hydroxy moieties. Polymerization of monomers A1 and B4 by ring-opening metathesis polymerization will, upon treatment with strong acids, give a polymer containing hydroxyl group. Similarly, the formation of free radicals is also possible from epoxide-containing monomer units such as those originating from B2.

In ring-opening metathesis polymerization, one polymer chain is produced per active site. An acyclic olefin can be used as a chain-transfer agent. Addition of an acyclic olefin of formula III, shown below, allows improved control over the molecular weight of the polymer and over the processibility of the reaction mixture as compared to reactions that do not utilize chain transfer agents:

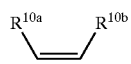

wherein $R^{10a}$ and $R^{10b}$ are hydrogen atom, hydrocarbyl, and substituted hydrocarbyl.

In this disclosure, symbols ordinarily used to denote elements in the Periodic Table take their ordinary meaning, unless otherwise specified. Thus, N, O and S stand for nitrogen, oxygen and sulfur, respectively.

A "hydrocarbyl" group means a monovalent or divalent, linear, branched or cyclic group which contains only carbon and hydrogen atoms. Examples of monovalent hydrocarbyls include the following: $C_1$–$C_{20}$ alkyl; $C_1$–$C_{20}$ alkyl substituted with one or more groups selected from $C_1$–$C_{20}$ alkyl, $C_3$–$C_8$ cycloalkyl, and aryl; $C_3$–$C_8$ cycloalkyl; $C_3$–$C_8$ cycloalkyl substituted with one or more groups selected from $C_1$–$C_{20}$ alkyl, $C_3$–$C_8$ cycloalkyl, and aryl; $C_6$–$C_{14}$ aryl; and $C_6$–$C_{14}$ aryl substituted with one or more groups selected from $C_1$–$C_{20}$ alkyl, $C_3$–$C_8$ cycloalkyl, and aryl; where the term "aryl" preferably denotes a phenyl, napthyl, or anthracenyl group. Examples of divalent (bridging) hydrocarbyls include: —$CH_2$—, —$CH_2CH_2$—, —$CH_2CH_2CH_2$—, and 1,2-phenylene.

A "substituted hydrocarbyl" refers to a monovalent, divalent, or trivalent hydrocarbyl substituted with one or more heteroatoms. Examples of monovalent substituted hydrocarbyls include: 2,6-dimethyl-4-methoxyphenyl, 2,6-diisopropyl-4-methoxyphenyl, 4-cyano-2,6-dimethylphenyl, 2,6-dimethyl-4-nitrophenyl, 2,6-difluorophenyl, 2,6-dibromophenyl, 2,6-dichlorophenyl, 4-methoxycarbonyl-2,6-dimethylphenyl, 2-tert-butyl-6-chlorophenyl, 2,6-dimethyl-4-phenylsulfonylphenyl, 2,6-dimethyl-4-trifluoromethylphenyl, 2,6-dimethyl-4-trimethylammoniumphenyl (associated with a weakly coordinated anion), 2,6-dimethyl-4-hydroxyphenyl, 9-hydroxyanthr-10-yl, 2-chloronapth-1-yl, 4-methoxyphenyl, 4-nitrophenyl, 9-nitroanthr-10-yl, —$CH_2OCH_3$, cyano, trifluoromethyl, and fluoroalkyl. Examples of divalent (bridging) substituted hydrocarbyls include: 4-methoxy-1,2-phenylene, 1-methoxymethyl-1,2-ethanediyl, 1,2-bis(benzyloxymethyl)-1,2-ethanediyl, and 1-(4-methoxyphenyl)-1,2-ethanediyl.

A "heteroatom" refers to an atom other than carbon or hydrogen. Preferred heteroatoms include oxygen, nitrogen, phosphorus, sulfur, selenium, arsenic, chlorine, bromine, silicon, and fluorine.

A "heteroatom connected hydrocarbyl" refers to a group of the type $E^{10}$(hydrocarbyl), $E^{20}H$(hydrocarbyl), or $E^{20}$(hydrocarbyl)$_2$, where $E^{10}$ is an atom selected from Group 16 and $E^{20}$ is an atom selected from Group 15.

A "heteroatom connected substituted hydrocarbyl" refers to a group of the type $E^{10}$(substituted hydrocarbyl), $E^{20}H$(substituted hydrocarbyl), or $E^{20}$(substituted hydrocarbyl)$_2$, where $E^{10}$ is an atom selected from Group 16 and $E^{20}$ is an atom selected from Group 15.

The term "fluoroalkyl" as used herein refers to a $C_1$–$C_{20}$ alkyl group substituted by one or more fluorine atoms.

The term "halohydrocarbyl" as used herein refers to a $C_1$–$C_{20}$ alkyl group substituted by one or more of fluorine, chlorine, bromine or iodine atoms.

The term "polymer" as used herein is meant a species comprised of monomer units and having a degree of polymerization (DP) of ten or higher.

As used herein, the terms "monomer" and "olefin monomer" refer to the olefin or the other monomer compound before it has been polymerized; the term "monomer units" refers to the moieties of a polymer that correspond to the monomers after they have been polymerized.

The term "chain-transfer agent" as used herein refers to a compound capable of reacting with the growing polymer chain at the metal-carbon double bond by metathesis, thereby cleaving off the polymer chain and generating a new initiator capable of polymerizing the monomers by ring-opening metathesis polymerization.

The term "metathesis" herein used refers to the reaction between a metal-carbon double bond and a carbon-carbon double bond, leading to a new metal-carbon double bond and a new carbon-carbon double bond through the formation of a metallocyclobutane intermediate.

In some cases, it is advantageous to attach the catalyst to a solid support. Examples of useful solid supports include: inorganic oxides, such as talcs, silicas, titania, silica/chromia, silica/chromia/titania, silica/alumina, zirconia, aluminum phosphate gels, silanized silica, silica hydrogels, silica xerogels, silica aerogels, montmorillonite clay and silica co-gels, as well as organic support materials such as polystyrene and functionalized polystyrene. (See, for example, S.B. Roscoe et al., "Polyolefin Spheres from Metallocenes Supported on Non-Interacting Polystyrene," 1998, *Science*, 280, 270–273 (1998) the contents of which are incorporated herein by reference).

The present invention is explained in greater detail in the following non-limiting Examples.

EXAMPLES

Example 1

To a solution of bis(tricyclohexylphosphine)benzylidine ruthenium(IV) dichloride (Strem Chemicals; 14.9 mg; 18.1 μmol) in 1 mL dichloromethane was added, under vigorous stirring, a solution of norbornene (298 mg; 3.16 mmol) and B2 (47.0 mg; 0.345 mmol) in 4 mL dichloromethane. The reaction was stirred at room temperature for 3 hours and 30 min. A few drops of vinyl ethyl ether was then added. After several hours, the viscous solution was diluted by addition of 4 mL dichloromethane. The polymer was precipitated by addition to 75 mL methanol. The mixture was filtered and the residual solid was dried in vacuo to give 313 mg of polymer.

Example 2

To a solution of bis(tricyclohexylphosphine)benzylidine ruthenium(IV) dichloride (Strem Chemicals; 9.7 mg; 10 μmol) in 2 mL dichloromethane was added, under vigorous stirring, a solution of B2 (282 mg; 2.07 mmol) in 4 mL dichloromethane. The reaction was stirred at room temperature for 20 hours. A few drops of vinyl ethyl ether was then added. After 2 hours, the polymer was precipitated by addition to methanol. The mixture was filtered and the residual solid was dried in vacuo. The solid was then redissolved in dichloromethane and reprecipitated by addition to methanol. The polymer was collected by filtration and further dried in vacuo, yielding 231 mg. ($T_g$=77° C.; $M_n$=73.3 K, $M_w$=139 K relative to polystyrene).

Example 3

To a solution of bis(tricyclohexylphosphine)benzylidine ruthenium(IV) dichloride (Strem Chemicals; 14.7 mg; 17.9 μmol) in 2 mL dichloromethane was added, under vigorous stirring, a solution of norbornene (258 mg; 2.74 mmol) and B1 (54.8 mg; 0.304 mmol) in 4 mL dichloromethane. The reaction was stirred at room temperature for 20 hours. A few drops of vinyl ethyl ether was then added. After 2 hours, the polymer was precipitated by addition to methanol. The mixture was filtered and the residual solid was dried in vacuo. The solid was then redissolved in dichloromethane and reprecipitated by addition to methanol. The polymer was collected by filtration and further dried in vacuo, yielding 273 mg. ($T_g$=35° C.; $M_n$=1932, $M_w$=33.5 K relative to polystyrene; 11 mol % incorporation of B1 by $^1$H NMR analysis).

Example 4

To a solution of bis(tricyclohexylphosphine)benzylidine ruthenium(IV) dichloride (Strem Chemicals; 7.7 mg; 8.2 μmol) in 2 mL dichloromethane was added, under vigorous stirring, a solution of B1 (308 mg; 1.71 mmol) in 4 mL dichloromethane. The reaction was stirred at room temperature for 20 hours. A few drops of vinyl ethyl ether was then added. After 2 hours, the polymer was precipitated by addition to methanol. The mixture was filtered and the residual solid was dried in vacuo. The solid was then redissolved in dichloromethane and reprecipitated by addition to methanol. The polymer was collected by filtration and further dried in vacuo, yielding 239 mg. ($T_g$=163° C.; 7.7 mol % incorporation of B1 by $^1$H NMR analysis; $M_n$=63,000).

Example 5

To a solution of bis(tricyclohexylphosphine)benzylidine ruthenium(IV) dichloride (Strem Chemicals; 22.0 mg; 26.7 μmol) in 3 mL dichloromethane was added, under vigorous stirring, a solution of norbornene (449 mg; 4.77 mmol) and B4 (143 mg; 0.736 mmol) in 4 mL dichloromethane. The reaction was stirred at room temperature for 3 hours. A few drops of vinyl ethyl ether was then added. After several hours, the polymer was precipitated by addition to methanol. The mixture was filtered and the residual solid was dried in vacuo, yielding 559 mg. ($T_g$=44° C.; 12 mol % incorporation of B4 by $^1$H NMR analysis; $M_n$(NMR)=30.6 K).

Example 6

To a solution of bis(tricyclohexylphosphine)benzylidine ruthenium(IV) dichloride (Strem Chemicals; 9.6 mg; 12 μmol) in 3 mL dichloromethane was added, under vigorous stirring, a solution of B4 (461 mg; 2.37 mmol) in 4 mL dichloromethane. The reaction was stirred at room temperature for 18 hours. A few drops of vinyl ethyl ether was then added. After 2 hours, the polymer was precipitated by addition to methanol. The mixture was filtered and the residual solid was dried in vacuo, yielding 444 mg. ($T_g$=86° C.; $M_n$(NMR)=47,100).

The foregoing is illustrative of the present invention, and is not to be construed as limiting thereof. The invention is defined by the following claims, with equivalents of the claims to be included therein.

We claim:

1. A polymer composition comprising repeat units of the formula

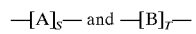

wherein A is a repeat unit derived from one or more monomers selected from the group consisting of:

A1

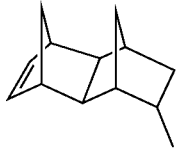

A2

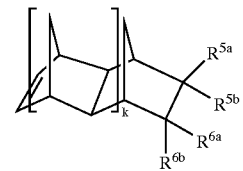

A3

A5

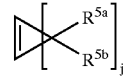

A6 and B is a repeat unit derived from one or more functional norbornene monomers selected from the group consisting of:

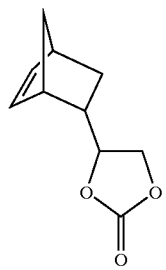
B1

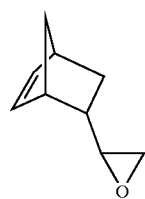
B2

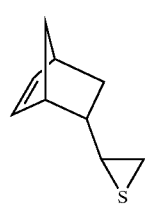
B3

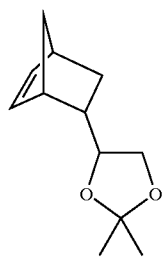
B4

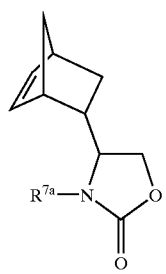
B5

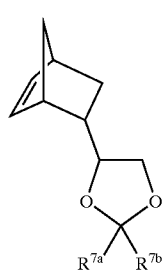
B6

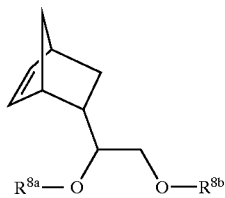
B7 wherein
- $R^{7a\text{-}b}$ is H, hydrocarbyl, substituted hydrocarbyl, or fluoroalkyl;
- $R^{8a\text{-}b}$ is H, hydrocarbyl, substituted hydrocarbyl, fluoroalkyl, or C(O)—$R^9$ where $R^9$ is hydrocarbyl or substituted hydrocarbyl;
- $R^{5a\text{-}b}$ and $R^{6a\text{-}b}$ are each independently H or hydrocarbyl;
- S and T represent the mole fraction of the respective repeat unit and sum to one with the proviso that T>0;
- k is from 0 to 3; and
- j is 1, 2, 3, 5, or 6, and wherein S is 0 and T is 1.

2. The polymer composition according to claim 1, wherein B is derived from monomer B1.

3. The polymer composition according to claim 1, wherein B is derived from monomer B2.

4. The polymer composition according to claim 1, wherein B is derived from monomer B4.

5. A polymer composition comprising repeat units of the formula

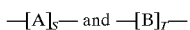

wherein A is a repeat unit derived from one or more monomers selected from the group consisting of:

A1

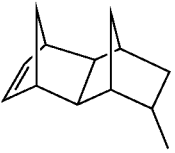
A2

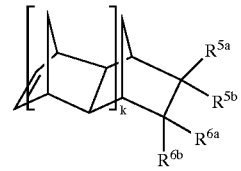
A3

A5

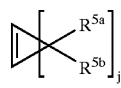
A6 and B is a repeat unit derived from one or more functional norbornene monomers selected from the group consisting of:

B1 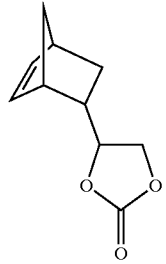

B2 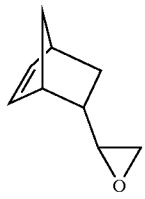

B3 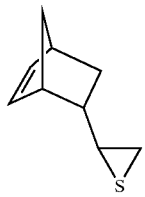

B4 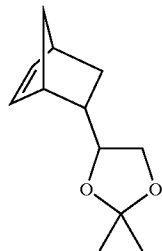

B5 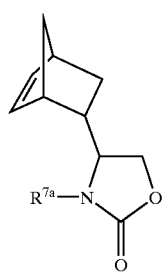

B6 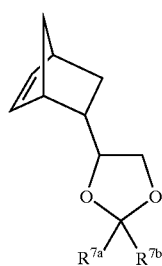

-continued

B7 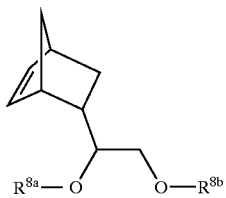

wherein $R^{7a-b}$ is H, hydrocarbyl, substituted hydrocarbyl, or fluoroalkyl;

$R^{8a-b}$ is H, hydrocarbyl, substituted hydrocarbyl, fluoroalkyl, or C(O)—$R^9$ where $R^9$ is hydrocarbyl or substituted hydrocarbyl;

$R^{5a-b}$ and $R^{6a-b}$ are each independently H or hydrocarbyl;

S and T represent the mole fraction of the respective repeat unit and sum to one with the proviso that T>0;

k is from 0 to 3; and j is 1, 2, 3, 5, or 6, and wherein the polymer composition is hydrogenated to remove unsaturation.

6. A polymer composition comprising repeat units of the formula

—[A]$_s$— and —[B]$_T$— wherein A is a repeat unit derived from one or more monomers selected from the group consisting of:

A1 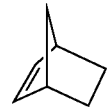

A2 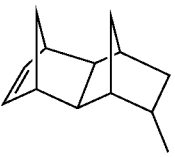

A3 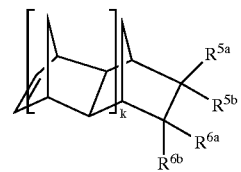

A5 

A6 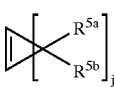

and B is a repeat unit derived from one or more functional norbornene monomers selected from the group consisting of:

B1 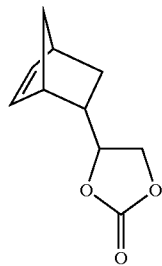

B2 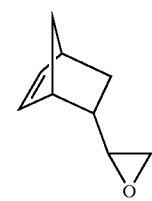

B3 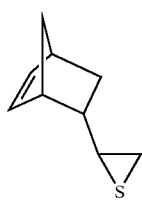

B4 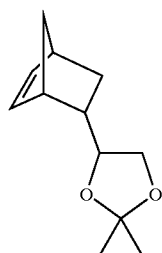

B5 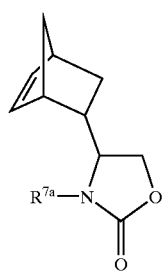

B6 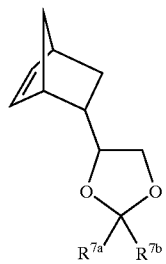

-continued

B7 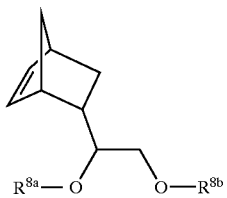

wherein $R^{7a-b}$ is H, hydrocarbyl, substituted hydrocarbyl, or fluoroalkyl;

$R^{8a-b}$ is H, hydrocarbyl, substituted hydrocarbyl, fluoroalkyl, or C(O)—$R^9$ where $R^9$ is hydrocarbyl or substituted hydrocarbyl;

$R^{5a-b}$ and $R^{6a-b}$ are each independently H or hydrocarbyl;

S and T represent the mole fraction of the respective repeat unit and sum to one with the proviso that T>0;

k is from 0 to 3; and j is 1, 2, 3, 5, or 6, and wherein the polymer composition is hydrolyzed to give pending hydroxyl moieties.

7. A polymer composition comprising repeat units of the formula

—[A]$_s$— and —[B]$_t$— wherein A is a repeat unit derived from one or more monomers selected from the group consisting of:

A1 

A2 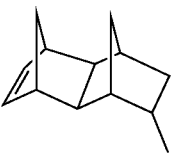

A3 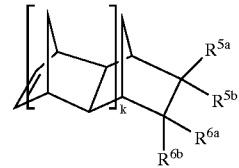

A5 

A6 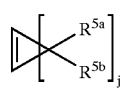

and B is a repeat unit derived from one or more functional norbornene monomers selected from the group consisting of:

B1 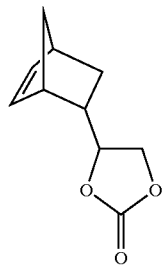

B2 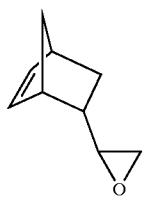

B3 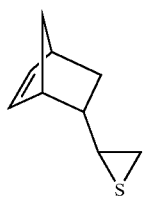

B4 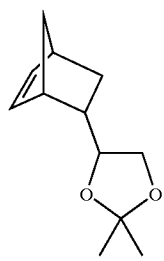

B5 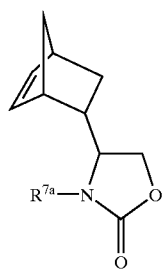

B6 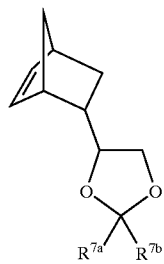

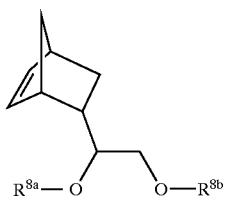 B7 wherein $R^{7a\text{-}b}$ is H, hydrocarbyl, substituted hydrocarbyl, or fluoroalkyl;

$R^{8a\text{-}b}$ is H, hydrocarbyl, substituted hydrocarbyl, fluoroalkyl, or C(O)—$R^9$ where $R^9$ is hydrocarbyl or substituted hydrocarbyl;

$R^{5a\text{-}b}$ and $R^{6a\text{-}b}$ are each independently H or hydrocarbyl;

S and T represent the mole fraction of the respective repeat unit and sum to one with the proviso that T>0;

k is from 0 to 3; and j is 1, 2, 3, 5, or 6, and wherein the polymer composition is a block copolymer.

8. A process for preparing a polymer composition comprising repeat units of the formula:

which comprises contacting at least one monomer(s) selected from the group consisting of:

 A1

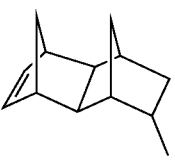 A2

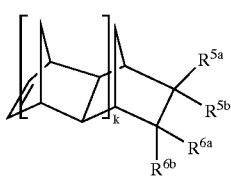 A3

 A5

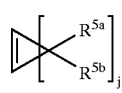 A6 with one or more monomer(s) selected from the group consisting of:

B1 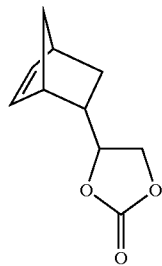

B2 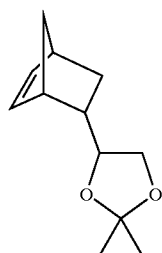

B3 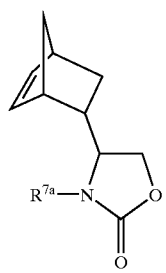

B4 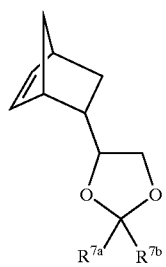

B5 

B6 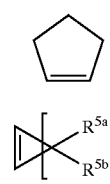

B7 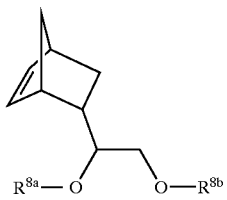

wherein $R^{7a-b}$ is H, hydrocarbyl, substituted hydrocarbyl, or fluoroalkyl;

$R^{8a-b}$ is H, hydrocarbyl, substituted hydrocarbyl, fluoroalkyl, or C(O)—$R^9$ where $R^9$ is hydrocarbyl or substituted hydrocarbyl;

$R^{5a-b}$ and $R^{6a-b}$ are each independently H or hydrocarbyl;

S and T represent the mole fraction of the respective repeat unit and sum to one with the proviso that T>0; and k is from 0 to 3; and j is 1, 2, 3, 5, or 6, said process further comprising hydrogenating the polymer composition to remove unsaturation.

9. A process for preparing a polymer composition comprising repeat units of the formula:

—[A]$_S$— and —[B]$_T$— which comprises contacting at least one monomer(s) selected from the group consisting of:

A1 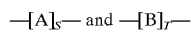

A2 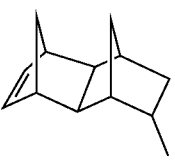

A3 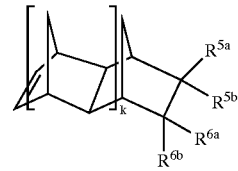

A5 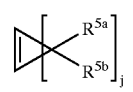

A6 with one or more monomer(s) selected from the group consisting of:

B1
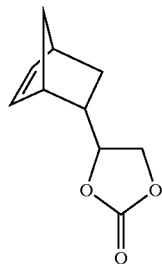

B2
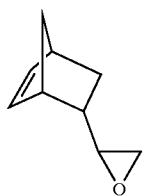

B3
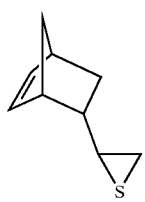

B4
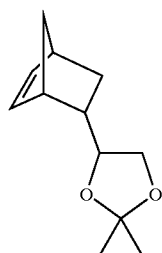

B5
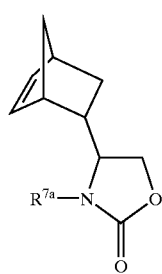

B6
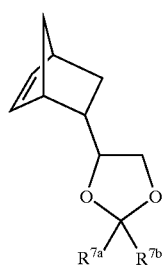

-continued

B7
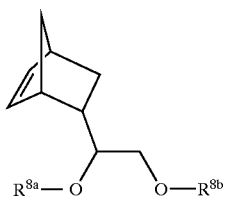

wherein $R^{7a\text{-}b}$ is H, hydrocarbyl, substituted hydrocarbyl, or fluoroalkyl;

$R^{8a\text{-}b}$ is H, hydrocarbyl, substituted hydrocarbyl, fluoroalkyl, or C(O)—$R^9$ where $R^9$ is hydrocarbyl or substituted hydrocarbyl;

$R^{5a\text{-}b}$ and $R^{6a\text{-}b}$ are each independently H or hydrocarbyl;

S and T represent the mole fraction of the respective repeat unit and sum to one with the proviso that T>0; and k is from 0 to 3; and j is 1, 2, 3, 5, or 6, said process further comprising hydrolyzing the polymer composition to provide pendant hydroxyl moieties.

10. A process for preparing a polymer composition comprising repeat units of the formula:

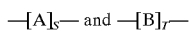

which comprises contacting at least one monomer(s) selected from the group consisting of:

A1
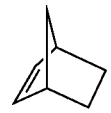

A2
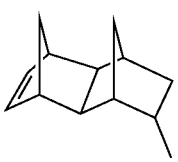

A3
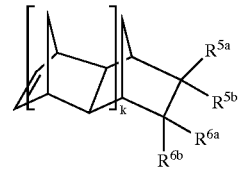

A5
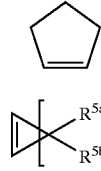

A6
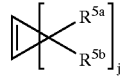

with one or more monomer(s) selected from the group consisting of:

-continued

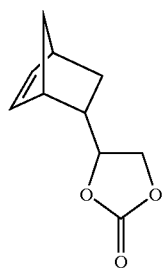
B1

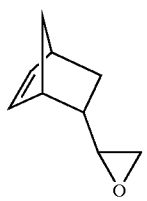
B2

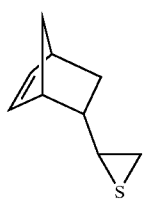
B3

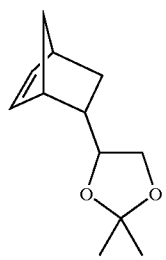
B4

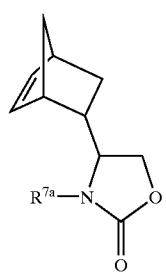
B5

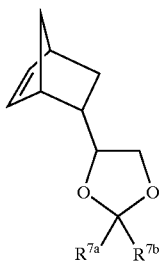
B6

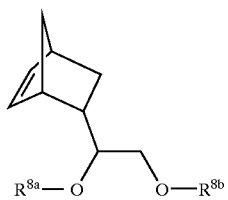
B7 wherein $R^{7a\text{-}b}$ is H, hydrocarbyl, substituted hydrocarbyl, or fluoroalkyl;

$R^{8a\text{-}b}$ is H, hydrocarbyl, substituted hydrocarbyl, fluoroalkyl, or C(O)—$R^9$ where $R^9$ is hydrocarbyl or substituted hydrocarbyl;

$R^{5a\text{-}b}$ and $R^{6a\text{-}b}$ are each independently H or hydrocarbyl;

S and T represent the mole fraction of the respective repeat unit and sum to one with the proviso that T>0; and k is from 0 to 3; and j is 1, 2, 3, 5, or 6, said process further comprising contacting said monomers with a chain transfer compound of the following formula:

III wherein $R^{10a}$ and $R^{10b}$ are selected from hydrogen, hydrocarbyl, and substituted hydrocarbyl.

* * * * *